US005509109A

United States Patent [19]

Kim et al.

[11] Patent Number: 5,509,109

[45] Date of Patent: Apr. 16, 1996

[54] SLOGAN AND INSCRIPTION CONTROL SYSTEM FOR A MAILING MACHINE

[75] Inventors: Hyung-Kun P. Kim, Wilton; Arno Muller, Westport, both of Conn.; Easwaran C. N. Nambudiri, Port Chester, N.Y.

[73] Assignee: Pitney Bowes Inc., Stamford, Conn.

[21] Appl. No.: 141,372

[22] Filed: Oct. 28, 1993

[51] Int. Cl.$^6$ .................................................... G06K 15/00

[52] U.S. Cl. .......................... 395/114; 395/112; 395/113; 395/101

[58] Field of Search .................................... 395/275, 114, 395/100, 101, 113, 106, 112, 275; 364/464.02, 464.03; 379/102

[56] References Cited

U.S. PATENT DOCUMENTS

| | | | |
|---|---|---|---|
| 4,644,142 | 2/1987 | Payn | 235/101 |
| 4,831,554 | 5/1989 | Storace et al. | 395/275 |
| 4,839,829 | 6/1989 | Freedman | 395/101 |
| 4,868,757 | 9/1989 | Gil | 364/464.03 |
| 5,321,604 | 6/1994 | Preach et al. | 364/401 |
| 5,390,251 | 2/1995 | Pastor et al. | 380/21 |

*Primary Examiner*—Mark R. Powell
*Assistant Examiner*—Tracy M. Legree
*Attorney, Agent, or Firm*—Angelo N. Chaclas; Charles G. Parks, Jr.; Melvin J. Scolnick

[57] ABSTRACT

A message control system particularly useful for postage meters of the type having bit-map printers includes encryption means for generating a code in a postage meter based on meter information and the desired information to be included in the message to be printed. The message and other data is furnished to a data center which then generates an authorization code to be furnished to the postage meter. When there is a match between the authorization and internal code, the message can be stored in the postage meter for printing. The messages may also reside in a slogan box which must remain connected to the meter in order for the slogan to be printed.

12 Claims, 10 Drawing Sheets

FIG. 8

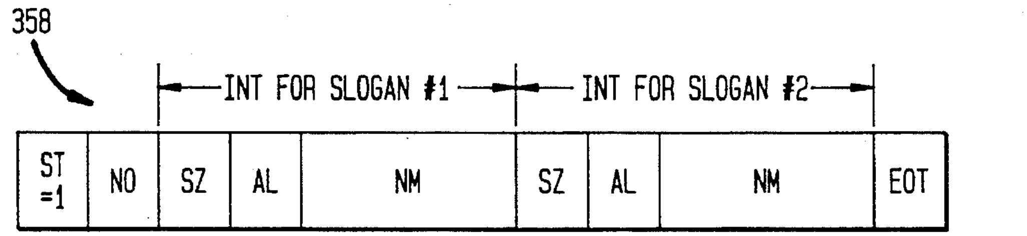

(A) FORMAT OF THE HEADER FOR SLOGAN/ENDORSEMENT

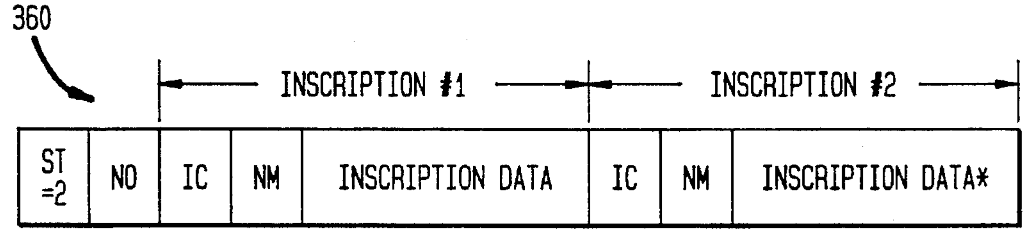

(B) INSCRIPTION FORMAT

| SYMBOL | DATA TYPE | SIZE (BYTE) | PARAMETERS |
|---|---|---|---|
| ST | SLOGAN BOX TYPE | 1 | 1=SLOGAN/ENDORSEMENT<br>2=INSCRIPTION |
| NO | NUMBER OF SLOGAN/ INSCRIPTIONS | 1 | 1 OR MORE |
| SZ | SIZE OF IMAGE IN BLOCK (BLOCK = 512 BYTES) | 1 | |
| AL | ALGORITHM | 1 | 0=STRAIGHT DIGITIZED BITS<br>1=COMPRESSION ALGORITHM #1<br>2=COMPRESSION ALGORITHM #2<br>3=MIXED: STOCK DESIGN & CHARACTERS<br>4=ASCII ENDORSEMENT |
| NM | NAME | 12 | |
| IC | ITEM CODE | 2 | 3-DIGIT |

SLOGAN AND INSCRIPTION CONTROL SYSTEM FOR A MAILING MACHINE

FIELD OF THE INVENTION

The invention relates to mail processing systems and more particularly to apparatus for printing inscriptions and advertising slogans in postage metering systems.

BACKGROUND OF THE INVENTION

Conventionally, in postage meter technology, advertising slogans and/or inscriptions showing classes of postage and the like have been made available to customers as a printing die which has been insertable in a print drum or perhaps as a rotatable slug as shown, for example, in U.S. Pat. No. 4,519,311 to Lowe.

Digital printing technology has made it possible to implement digital, i.e. bit map addressable, printing for the purpose of evidencing payment of postage by a postage-meter-like device. In addition to an indicia which is printed by postage meters, typically there may be printed an associated inscription as to the class of mailpiece, slogan or an additional message which is selected by the user to personalize the imprint.

U.S. Pat. No. 4,934,846 to Gilham discloses a slogan or the like being fed from the franking machine to a thermal printer. U.S. Pat. No. 4,831,554, assigned to the assignee of the instant application, shows a postage meter system for printing slogans or messages and for changing such slogans or messages by way of downloading by telephone from a database at a data center. While the latter patented invention may work well in most situations, there may be for some users insufficient flexibility for ease of use and range of creativity for the slogans, particularly in order to take advantage of current advertising trends or events. A problem arises, however, in allowing such flexibility since the all users may not be able to use all inscriptions and any slogan selected by the mailer must not, for example, be obscene and must meet other legal requirements for use on mailpieces.

SUMMARY OF THE INVENTION

It is therefore an object of the invention to provide a digital inscription and slogan printing system in which a slogan or inscription is easily changed and yet which will allow sufficient monitoring to preclude illegal slogans from being printed.

It is a further object of the invention to provide a method for control of messages to be printed by a bit-mapped printer used in a mailing system.

It is another object to provide a method for easily changing the inscriptions and slogans for each meter in a manner that provides for generation of slogans by a user and yet provides security for the implementation of the changes.

The above and other objects are attained a method for control of messages to be printed by a bit-mapped printer comprising the steps of providing a plain text message for printing by the printer, encoding the message at the printer using a predetermined algorithm to provide an internally generated code, communicating the message to a data center, calculating at the data center an authorization code corresponding to the encoded message, comparing at the printer the authorization code with the internally generated code for enabling the printing of the message.

In another aspect, there is provided a method for changing printed messages a postage meter comprising the steps of providing within said meter a plurality of messages, each of said messages being enabled for printing by a corresponding enabling bit activated in said meter, providing a decoding means in said meter for decoding an authorization code and for activating ones of said enabling bits in accordance with the decoding of the authorization code, communicating information to a data center in respect of the postage meter and a desired message to be enabled, providing to the meter an authorization code from the data center, said authorization code being operable for being decoded at said meter for enabling activation of the selected one of the enabling bits for printing of the desired message whereby security is provided for the implementation of the changes.

In yet another aspect of the invention there is provided in a postage meter of the type including a bit-map printer, apparatus for control of messages to be printed by the bit-mapped printer comprising means for generating an internal code from predetermined postage meter information and a desired message, means for comparing at said meter an authorization code received from a data center with said internal code, said authorization code being based on the predetermined meter information and the desired message furnished to the data center, and means for storing the desired message in said postage meter when there is a match of said authorization code with said internal code at the comparison means.

In still another aspect the slogans may be stored in an external slogan box which the meter can access via a communication port and which must be connected for communication in order for the slogan to be printed by the postage meter.

BRIEF DESCRIPTION OF THE DRAWING

FIG. 8 shows an example of the format of slogans and encryptions in the slogan box.

DESCRIPTION OF THE PREFERRED EMBODIMENT

Figure 1:
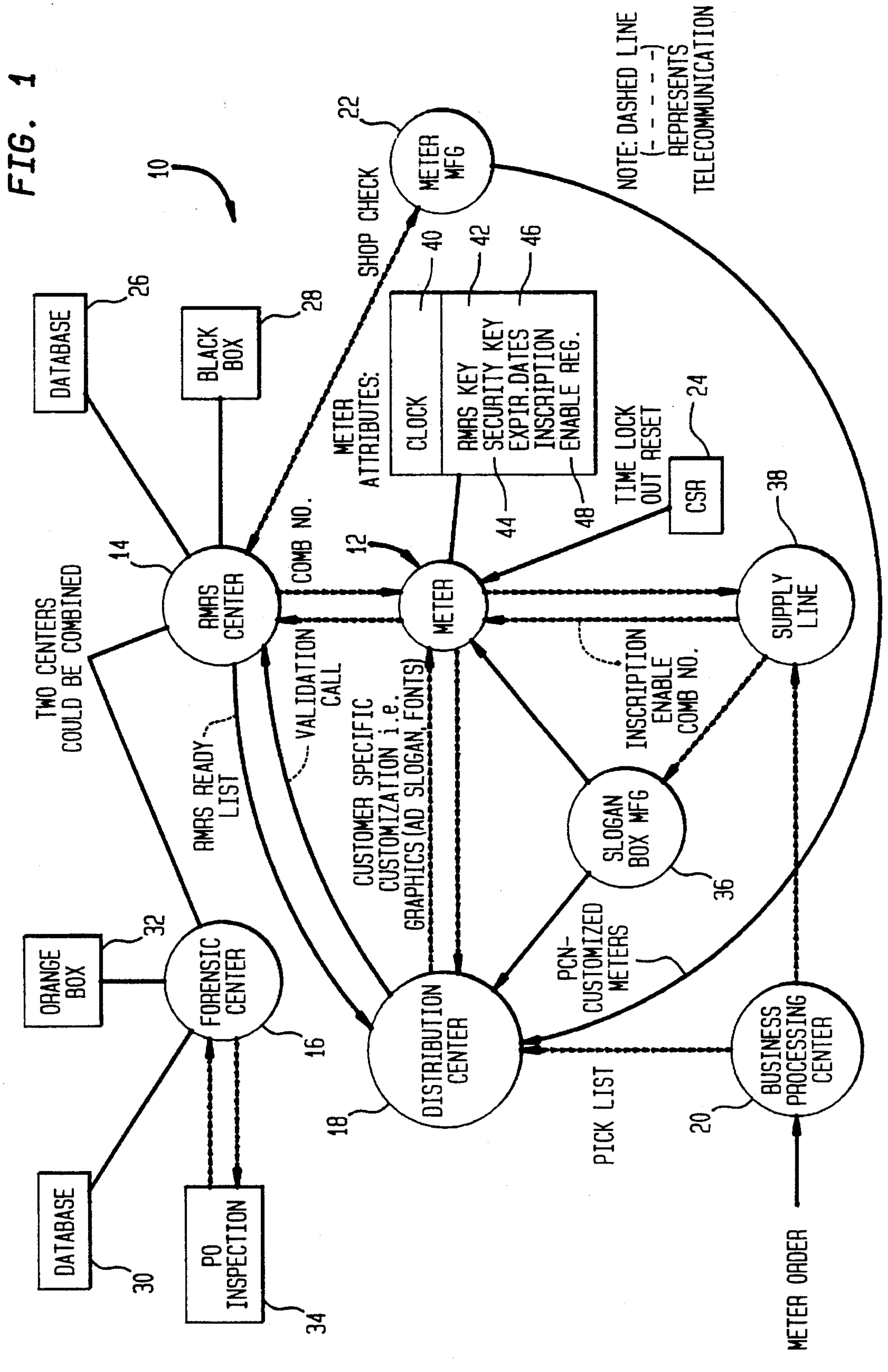
FIG. 1 is a schematic view of a system which may be used in accordance with the invention.

In FIG. 1, there is shown generally at 10 an overall system which may be used to generate and control the use of slogans in accordance with the invention. In the embodiment illustrated, the system comprises a meter or postage evidencing device (PED) 12 interacting with a plurality of different centers. A first center is a well-known meter-fund resetting center 14 of a type described, for example, in U.S. Pat. No. 4,097,923 which is suitable for remotely adding funds to the meter to enable it to continue the operation of dispensing value bearing indicia. In accordance with the invention there is also established a security or forensic center 16 which may of course be physically located at the resetting center 14 but is shown here separately for ease of understanding. Alternatively such a security or forensic center could be an entirely separate facility maintained by the Postal Authorities, for instance, or two separate facilities may be maintained in order to provide levels of security, if desired. The dashed lines in FIG. 1 indicate telecommunication between the meter 12 and the resetting center 14 (and/or forensic center 16).

Typically there may be an associated meter distribution center 18 which is utilized to simplify the logistics of placing meters with respective users. Similarly, a business processing center 20 is utilized for the purpose of processing orders for meters and for administration of the various tasks relating to the meter population as a whole.

The meter manufacturer indicated at 22 provides customized meters or PED's to the distribution center 18 after establishing operability with shop checks between the manufacturer and the resetting center 14 and forensic center 16. The meter or PED is unlocked, or has its lockout timer reset, at the user's facility by a customer service representative indicated here by the box 24.

At the resetting center 14 a database 26 relating to meters and meter transactions is maintained. The resetting combinations are generated by a secured apparatus labeled here as the BLACK BOX 28. The details of such a resetting arrangement are found in U.S. Pat. No. 4,097,923, herewith specifically incorporated by reference herein, and will not be further described here.

Database 30 and a secured encryption generating apparatus, designated here as ORANGE BOX 32 are maintained at the security center 16. The orange box preferably uses the DES standard encryption techniques to provide a coded output based on the keys and other information in the message string provided to it. It will be understood that other encoding arrangements are known and the invention is not limited to the specific embodiment using DES encoding. The security or forensic center, wherever maintained, is preferably connected by telecommunication with any Post Office inspection station, one of which is indicated here at 34.

Further details are to be found in U.S. Pat. No. 5,590,251 issued on Feb. 14, 1995, assigned to the assignee of the instant application and specifically incorporated by reference herein.

Other systems for monitoring meters will occur to those skilled in the art and the present invention is not intended to be limited by the particular types of marketing, distributing, and data centers illustrated in the preferred embodiments shown herein.

Returning now to the meter 12, as illustrated, the meter includes a clock 40 which is secure and which is used to provide a calendar function programmed by the manufacturer and not available to the user. Such clocks are well known and may be implemented in computer routines or in dedicated chips which provide programmable calendar outputs. Also stored within the registers of the meter 12 are a fund resetting key 42, security key 44, expiration dates 46 and preferably, an inscription enable flag 48.

Figure 2:
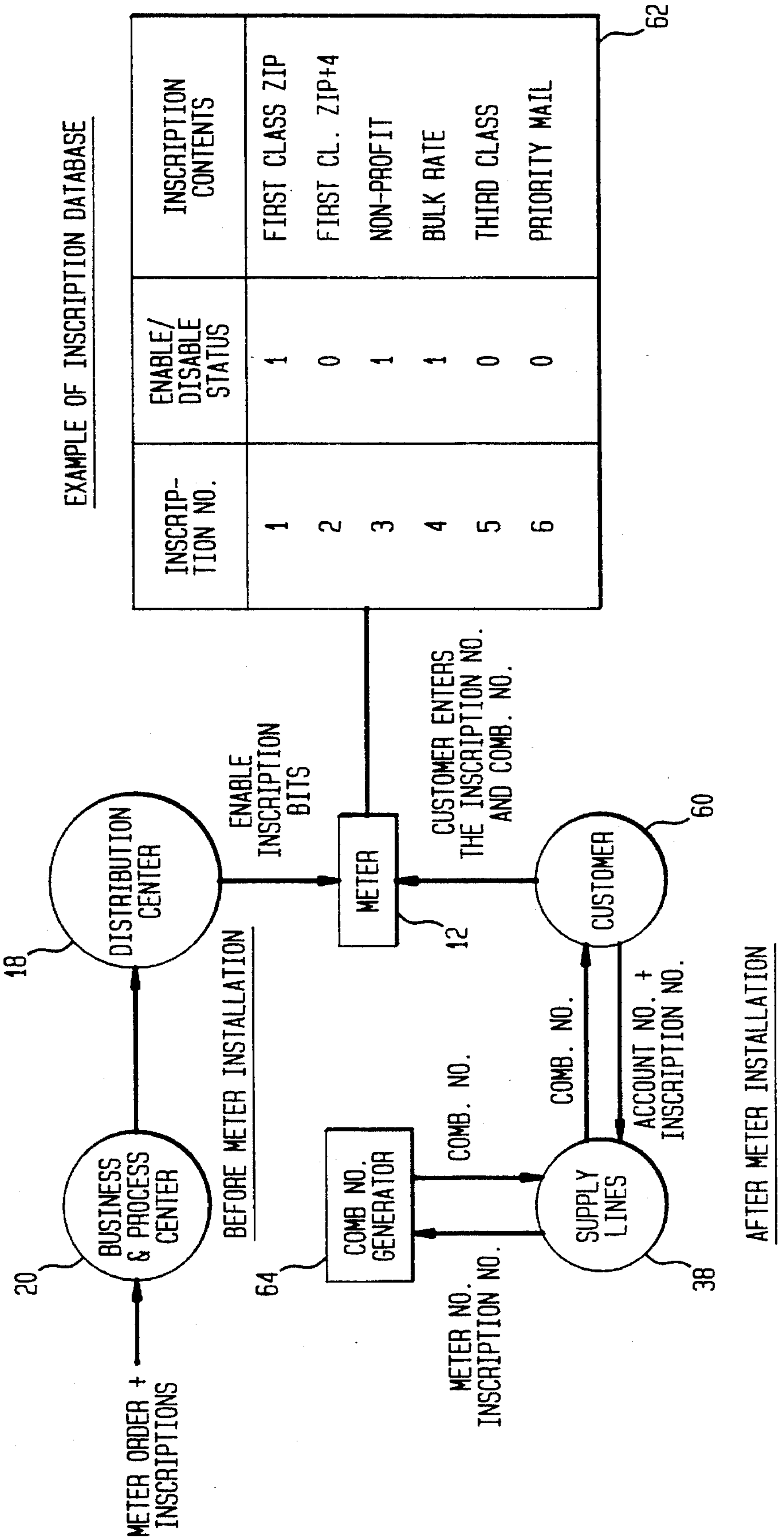
FIG. 2 illustrates further details of an inscription or slogan authorization system in accordance with the invention.

FIG. 2 is a schematic diagram of the inscription enable process for a meter in accordance with the invention which may also be used for slogan generation as described herein. The meter order is received at the business processing center 20. Included in the order, for example, is information as to the various ones of a plurality of inscriptions that the user wished to have made available for operation. The information is forwarded to the distribution center 18 which enables the desired inscription bits and forwards the meter to the customer indicated here at 60. A typical example of an inscription database is illustrated at 62 where the meter inscriptions No. 1 for FIRST CLASS ZIP, No. 3 for NON-PROFIT, and No. 4 for BULK RATE are shown as being enabled. It will be understood that any combination of choices is readily available and may be made by as desired and configured by the distribution center.

In order for the customer to change the inscriptions available for use without physically returning the meter or requiring a service representative to call on the customer, access to the change the enabling status bits is controlled by the generation of combinations for the particular meter by combination generator 64. In order to accomplish the change, the customer calls the manufacturer supply line 38 giving the Account Number and the desired inscription number and in response, the customer is furnished a combination which when entered into the meter along with the inscription number will cause the appropriate corresponding enabling bit to change. In addition to the inscriptions shown, the process may be used to control the advertising slogans printed by the meter as described below.

Figure 3:
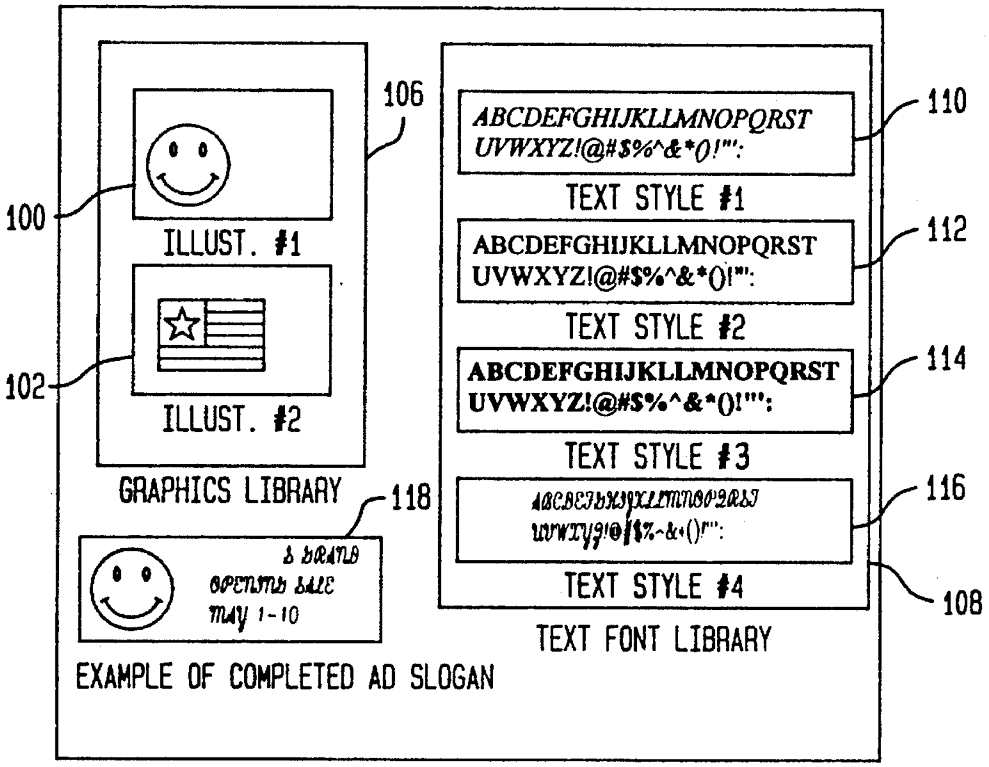
FIG. 3 shows examples of graphics and text font libraries which may reside at the meter and an example of a completed advertising slogan.

FIG. 3 illustrates an example of the graphics and text font libraries which may reside in a postage meter or PED in accordance with the invention as well as a completed representative advertising slogan. A smile symbol is shown at 100 while a flag is illustrated at 102 as representative samples of a plurality of graphic illustrations which may be made available to the user in a graphics library indicated here generally at 106. Suitably each of the illustrations in the library will have a corresponding number associated therewith. There may also be resident in a font library 108 a plurality of text styles as shown at 110, 112, 114, and 116, each also having a suitable number associated therewith. An example of a completed advertising slogan is shown at 118.

Figure 4:
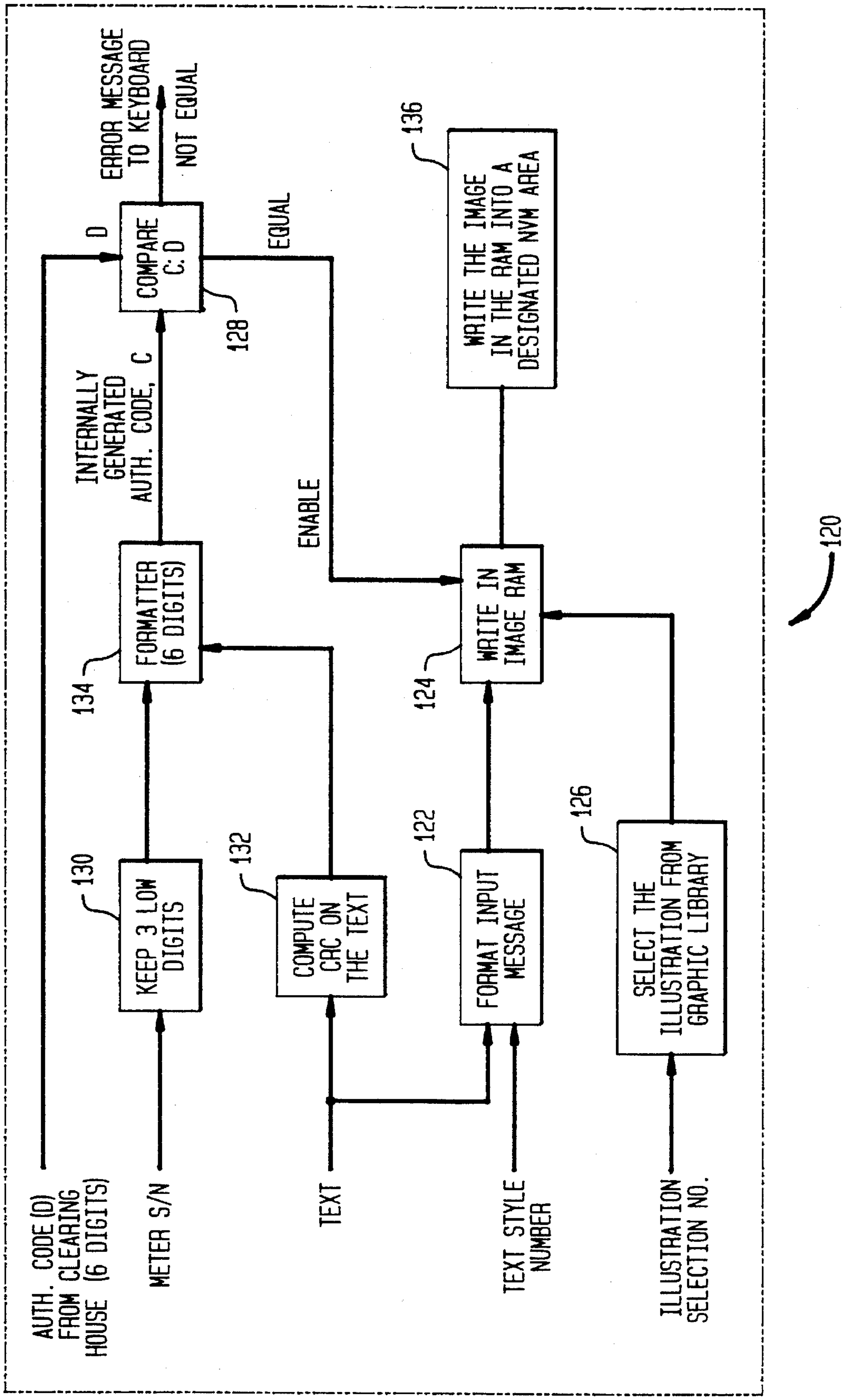
FIG. 4 is a block diagram of advertising slogan generation in the postage meter.

FIG. 4 illustrates generally at 120 in a block diagram the generation of an authorized ad slogan in accordance with the invention. The user inputs the slogan information to the meter via conventional user input means not shown. The required information includes a selected illustration, for example, illustration No. 1 from the graphics library; a text style, for example, Italic (No. 4); and a message text, including space and carriage returns. The text style selection and text are fed to block 122 to format the input message which is written into image RAM, block 124, along with the selected illustration from the graphic library, block 126, upon enabling from the comparison test block 128. Suitably, if the slogan is to be text-only the graphic number may be 0.

In accordance with the invention, in order to provide authorization for the text, a code is generated by the meter based on the message and the Meter Number or an NVM no., if desired. Suitably, for example, the meter or NVM number is truncated to the three least significant digits, block 130, and a CRC is computed in known manner on the input text, block 132, the output of each block being fed for formatting to block 134, from which an authorization code, here designated C, is generated using any suitable known technique such as DES encryption or the like.

The user then enters an Authorization code, here shown as D, received from a clearing house or data center, which may be the distribution center 18, whereupon the code D is compared at block 128 with the internally generated code C. If the codes are not equal an error message is provided and if the same, the enable signal is provided to enable the write into image RAM 124 described previously and the combined illustration and text are written into a predetermined area of a Non-Volatile Memory (NVM), block 136, from which the properly formatted slogan may be called for printing as desired.

Figure 5:
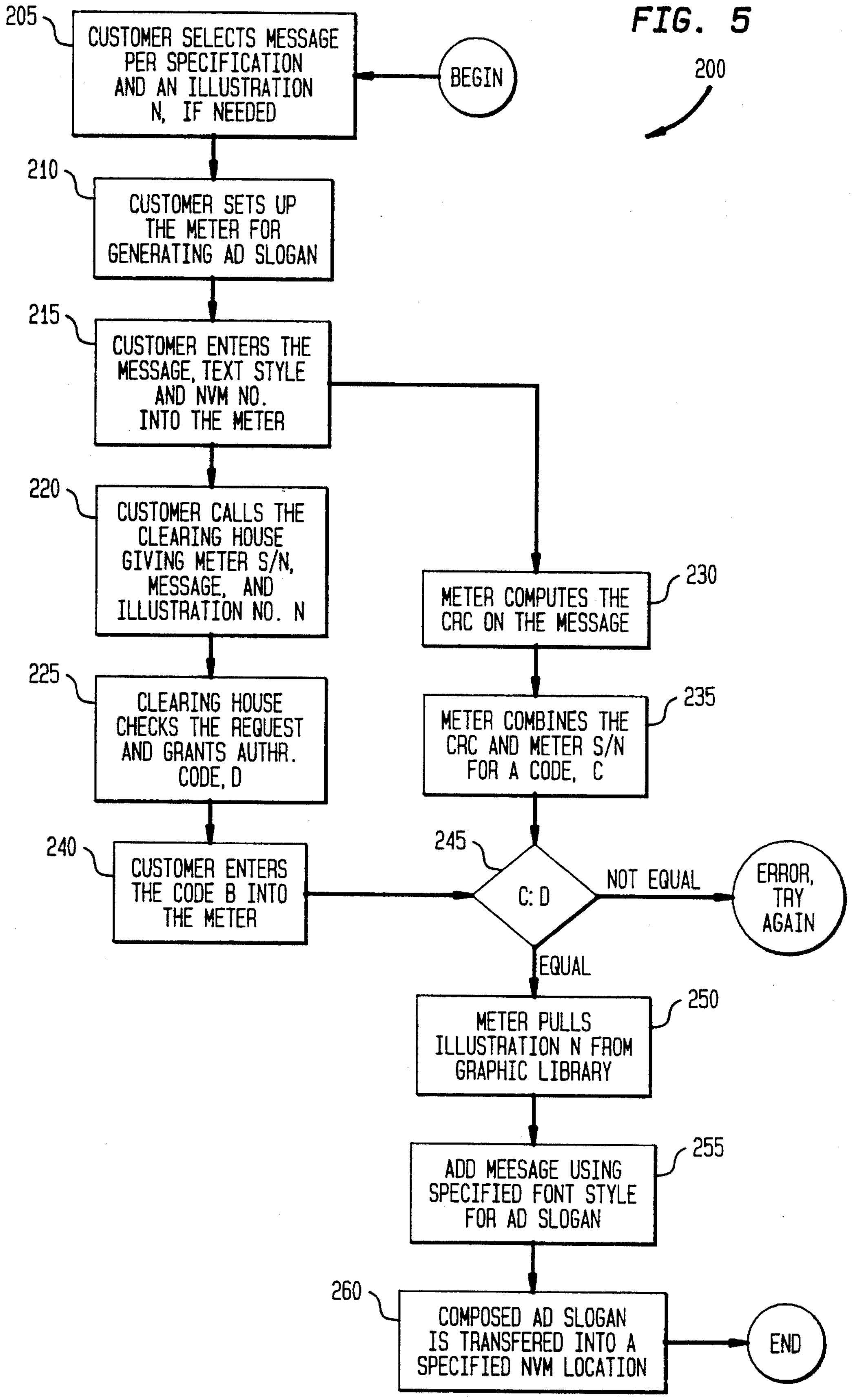
FIG. 5 is a flow chart of a method of changing the slogan in accordance with the invention.

FIG. 5 illustrates generally at 200 a flow chart for generating the slogan. The flow chart shows the operation at both the meter and the data center. The customer selects a desired message in accordance with a predetermined specification such as maximum number of words and number of lines along with an illustration if desired, block 205. The customer sets up the meter for generating the slogan, block 210, and enters the message, test style, and meter or NVM no. into the meter, block 215.

The customer calls the data center, giving the meter ID, message and illustration number, block 220, and the data center checks the request to see if the wording is legal, that is, the message is not obscene, within suggested guidelines, etc., and, if valid, the authorization code will be generated by a computer at the data center and provides the authorization code D to the customer, block 225. It will be understood that many of the functions may be handled at the data center with the aid of a socalled "intelligent" computer to check spelling and legal requirements. Preferably the authorization code is a function of the actual text, the message length, and the meter serial number. The computer will of course use the same algorithm as discussed in connection with FIG. 4 to generate the authorization code.

In the meantime the meter computes the CRC on the text, block 230, and produces an internal code C, block 235. The customer having received the authorization code from the data center inputs it to the meter, block 240. It will be understood that these transactions may be made by MODEM directly from the data center to the meter if desired or via touchtone communication as described in U.S. Pat. No. 4,831,554. A comparison is made between the internal code and the authorization code, decision block 245, and if they do not match an error signal is generated; If they are equal, the meter selects the desired illustration, block 250, produces the ad slogan, block 255, and transfers the composed slogan to a specified NVM location, block 260, and the slogan generating program ends.

Figure 6:
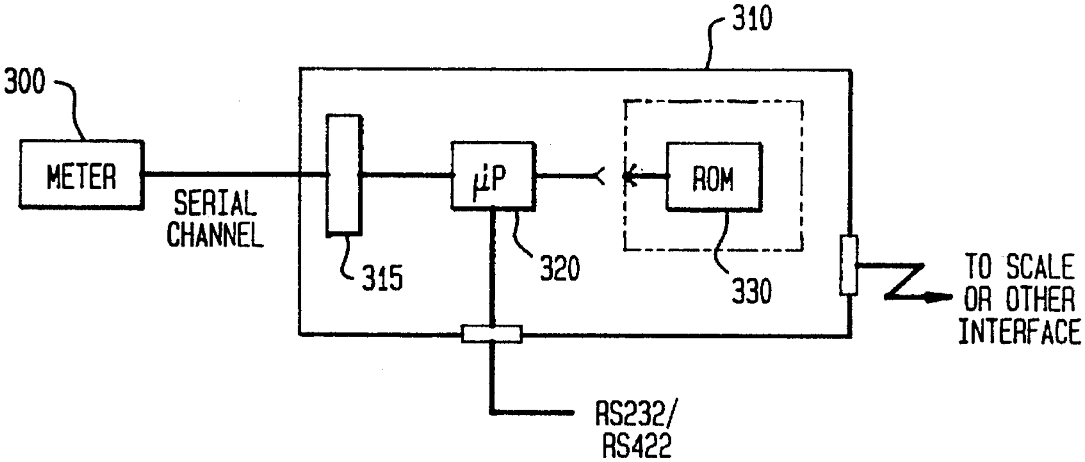
FIG. 6 illustrates another embodiment for housing a slogan generating system which may be separate from the meter.

It will be appreciated that in accordance with the invention, the transfers may be made by way of an external device communicating with the meter. FIG. 6 shows such an alternative embodiment for housing the slogan generation apparatus. In this alternative embodiment, meter 300 is suitably connected to a slogan generation box 310 via a serial channel interface 315, for example, and also to other devices via suitable serial and/or Echoplex channels as known in the art. Microcomputer 320 may be used to format and produce the required codes as previously described in connection with FIG. 4. ROM 330 may also be used for storage of different graphics libraries, slogans and other programs as desired. ROM 330 may also be installed in a socket so as to be replaceable to enable other slogans and graphics to be installed as desired.

Figure 7:
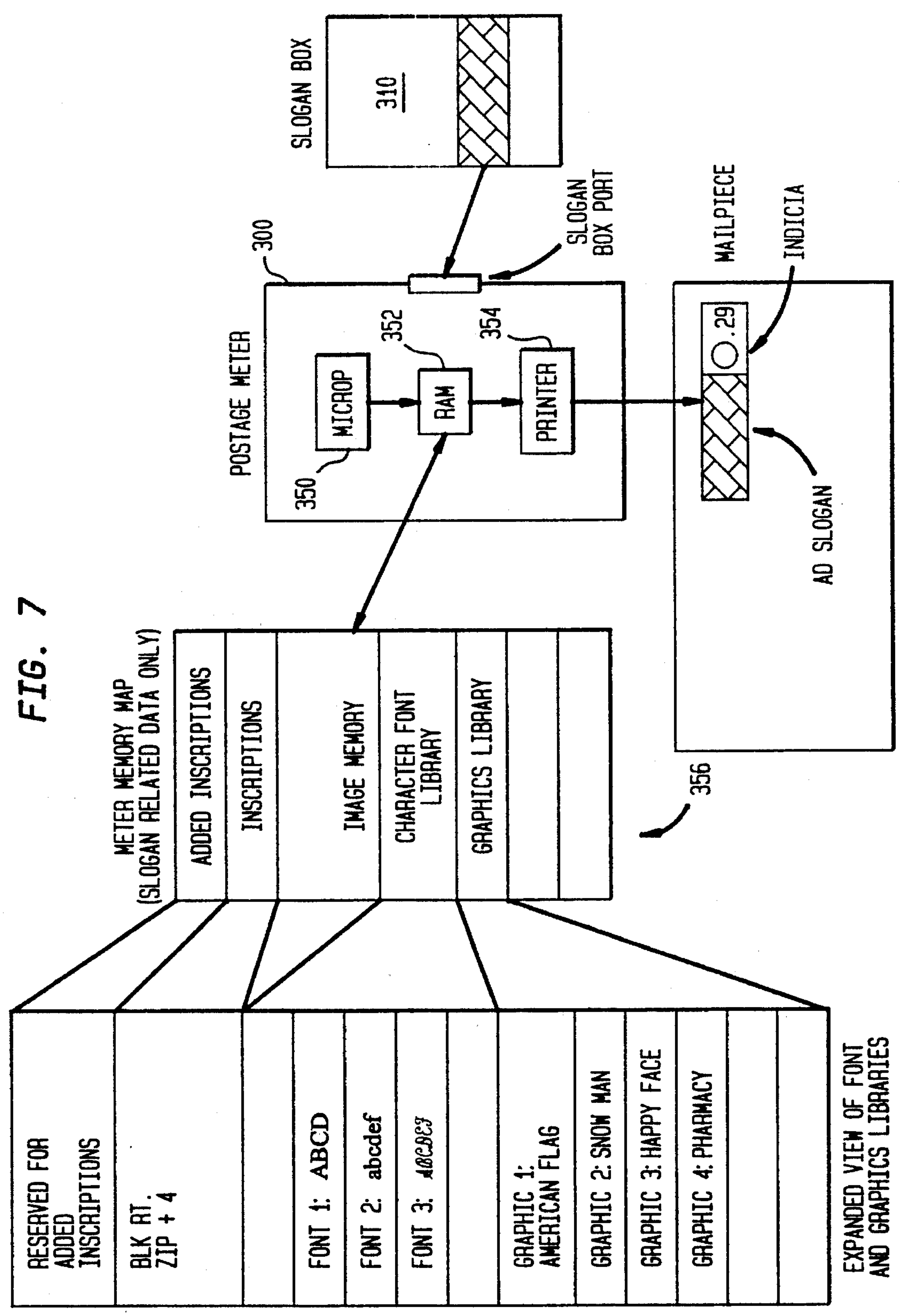
FIG. 7 illustrates the embodiment of FIG. 6 showing one example of a memory map in a RAM of the meter for use with the slogan box connected to the postage meter or PED for providing slogans for printing.

FIG. 7 shows the postage meter 300 comprising a microprocessor 350, random access memory (RAM) 352, and printer 354 connected to the slogan box 310 as described in connection with FIG. 6. In respect to the RAM 352 there is illustrated a memory map showing generally at 356 the registers for storing information in respect of the slogans. These illustrations are by way of example only and others will come readily to mind for those skilled in the art.

FIG. 8 illustrates possible formats of header data in the slogan box in accordance with the invention. The slogan format is illustrated at 358 while the inscription format is shown at 360. The table below describes the data types associated with each format. ST is the slogan type and in the illustrated embodiments may be either 1 or 2. NO is the number of the slogan or inscription. SZ is the size of the image represented in blocks, where one block is defined as 512 bytes. AL shows the number of the algorithm used for digitizing the slogan. IC is an item code, preferably three digits, required for all inscriptions. NM shows the name of the slogan or inscription. For best results, when the meter selects the particular slogan, the name will be displayed in the meter display as a positive response to the selection. It will also be understood that as described above the meter may be expected to have loaded the popular inscriptions for selection. It is also contemplated that the inscriptions described herein can be downloaded permanently from the slogan box into the meter NVM if desired.

Figure 9:
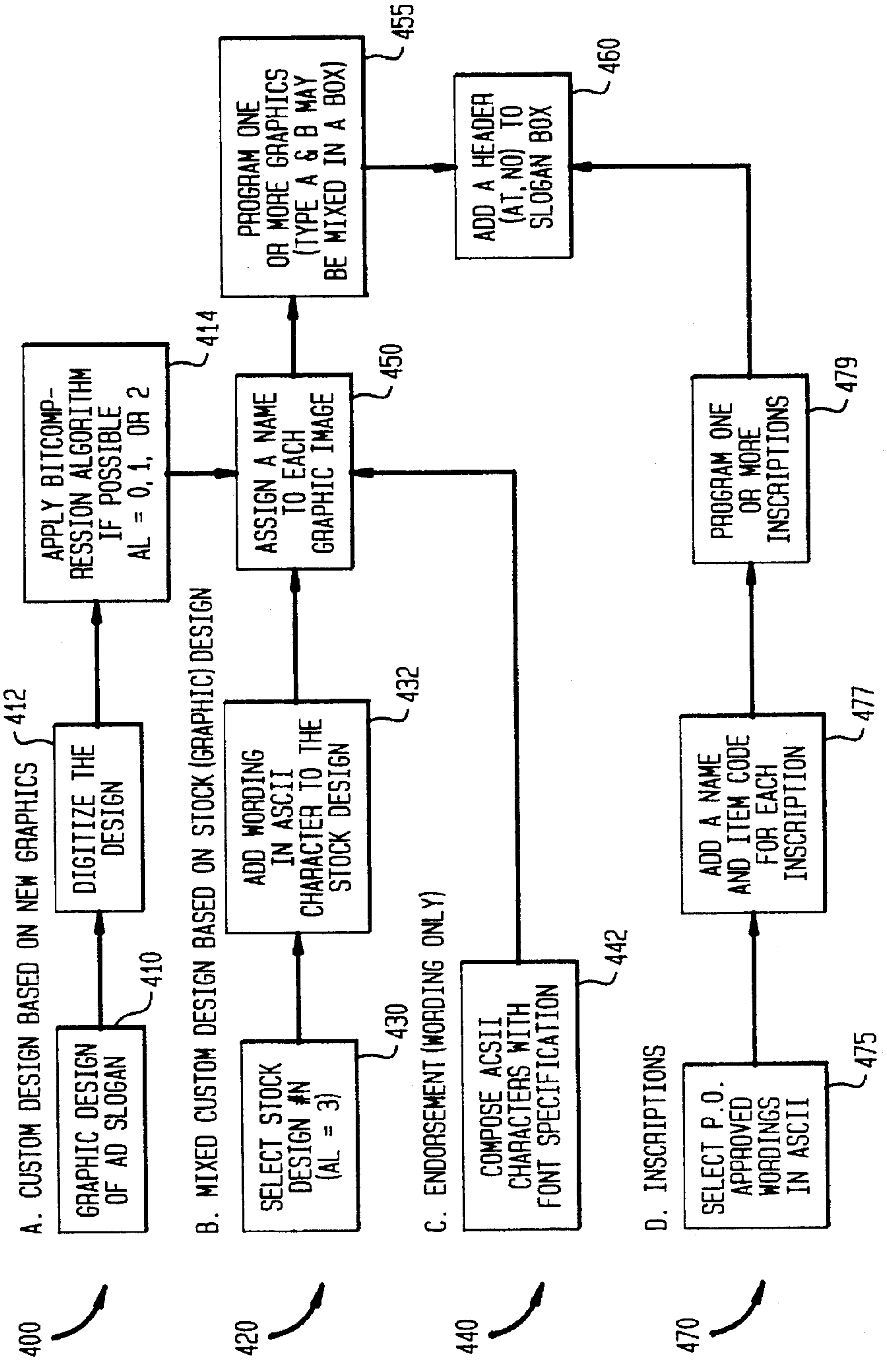
FIG. 9 shows four types of production steps for use with a slogan box in accordance with the invention.

FIG. 9 illustrates four possible ways in which the slogan box may be programmed. For the slogans, there are three paths. A custom design based on new graphics is illustrated at branch 400. The graphic design produced at block 410 is digitized, block 412, and a bit-compression algorithm is applied, block 414. A mixed custom approach based on a stock design is illustrated at branch 420, where the stock design is selected, block 430, and wording is added at block 432. Branch 440 illustrates the case where the slogan comprises wording only as shown at block 442. At the end of each of the branches, a name is assigned, block 450, the graphics are programmed, block 455, and a header added, block 460.

In the case of inscriptions, the process is shown at branch 470. The approved wordings are selected, block 475, a name and item code for each inscription is added, block 477, and the inscriptions programmed, block 479. Then as shown for the slogans, an appropriate header is added at block 460.

Figure 10A:
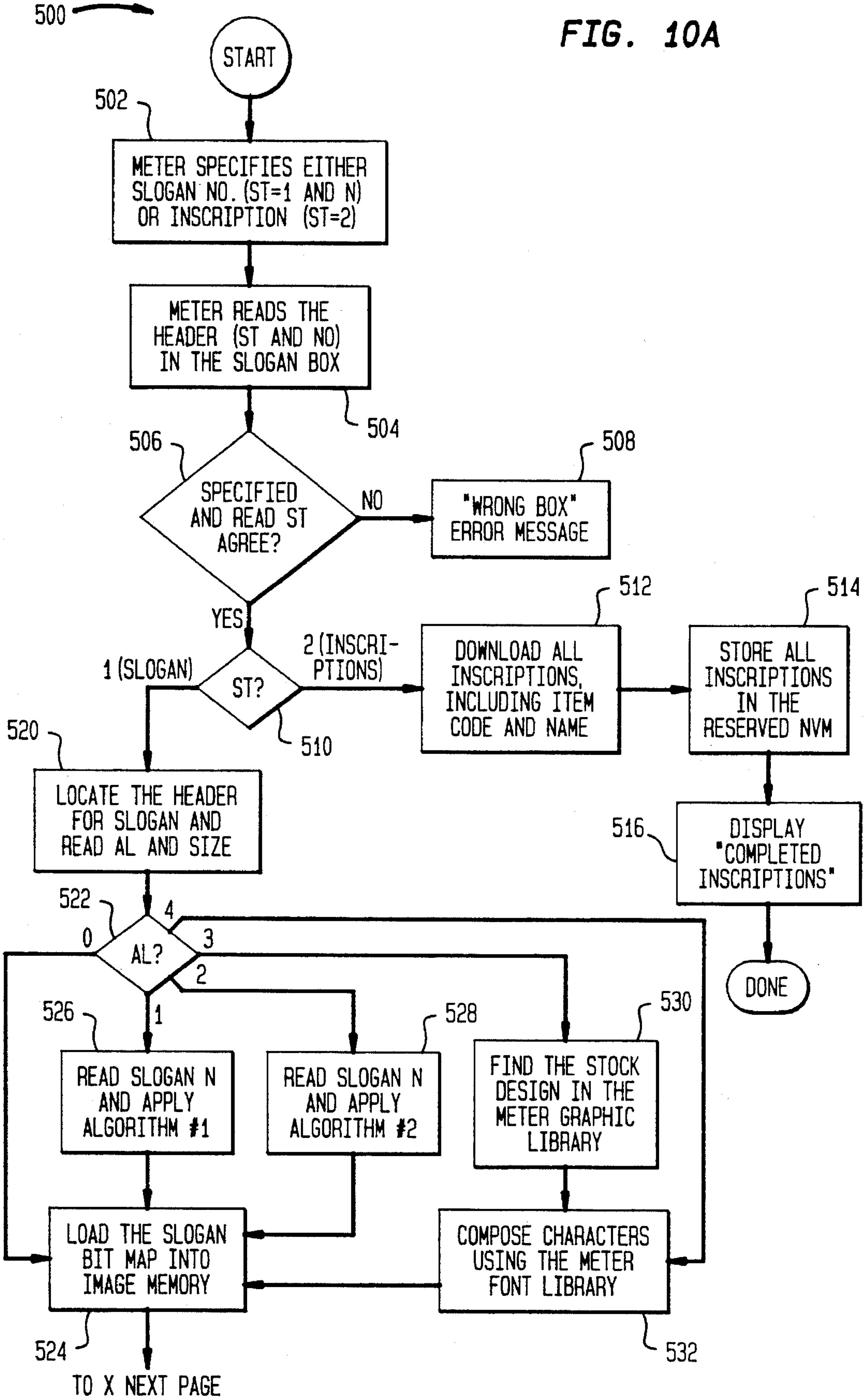
FIGS. 10*a* and 10*b* comprise a flow chart of the transfer of slogan and inscription data from the slogan box to the meter.
Figure 10B:
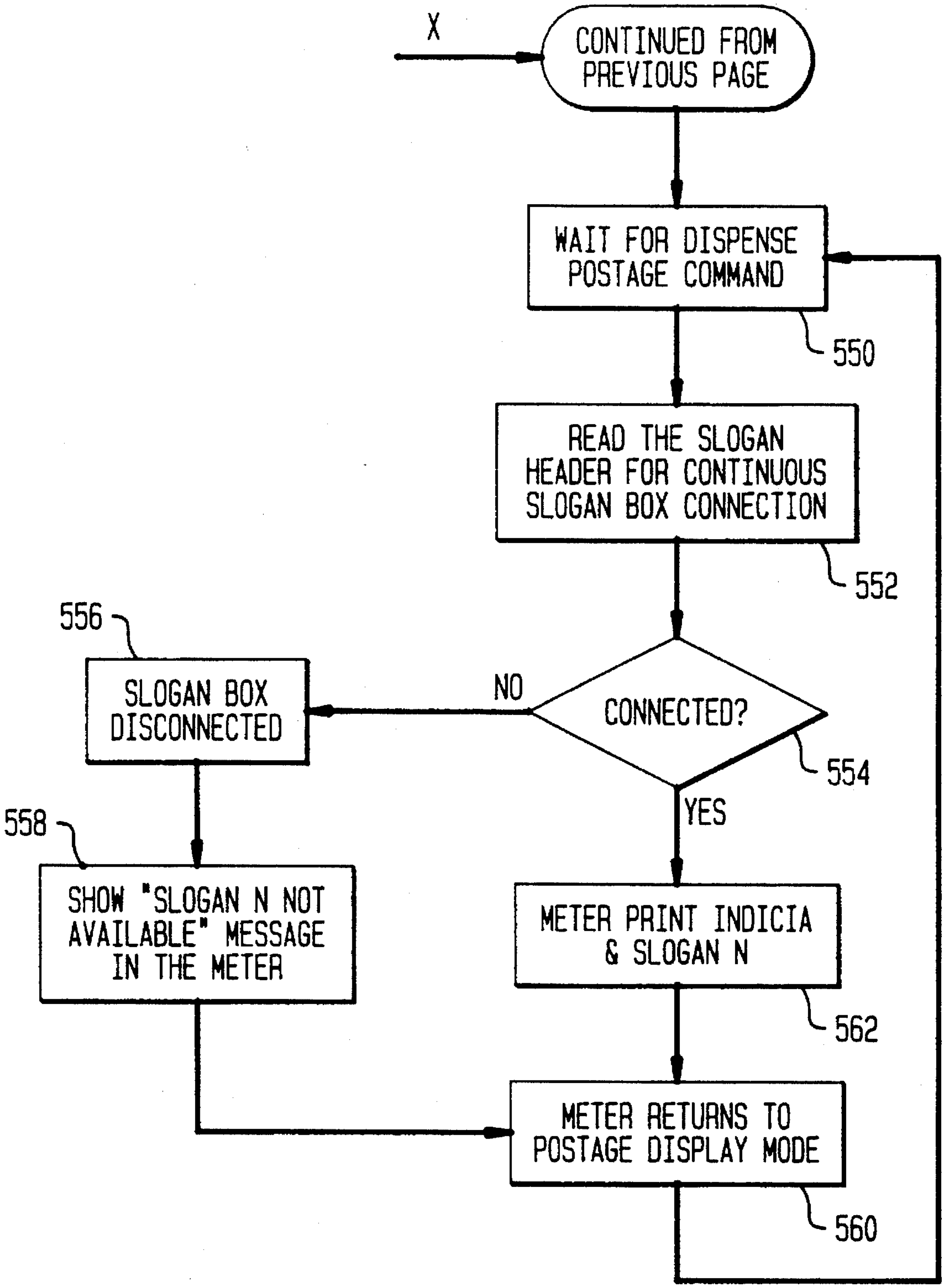

FIGS. 10*a* and 10*b* comprise a flow chart showing the transfer of slogan and inscription information from the slogan box to the meter. As shown generally in the flow chart at 500, the meter requests either a slogan or an inscription, block 502, and reads the corresponding header in the slogan box, block 504. The ST's of the specified request and the read data are compared, decision block 506, and if not the same, an error message is generated, block 508. The YES branch falls to decision block 510 where the ST is checked. If ST=2, the inscriptions are downloaded, block 512, stored in NVM, block 514, and a meter response is displayed, block 516, to indicate successful completion.

If ST=1, i.e. a slogan is specified, the header is located and AL is read, block 520. Depending upon the AL number, decision block 522, the program branches in accordance with the type of slogan as described in connection with FIG. 9. For AL=0, the slogan bit map is loaded into image memory, block 524. For AL-1, the slogan is read and algorithm #1 is applied, block 526, prior to loading the bit map into memory. For AL=2, the slogan is read and algorithm #2 is applied, block 528. For AL=3, the stock design is found in the graphic library, block 530, and the characters are composed, block 532, prior to loading the slogan bit map. For AL=4, the block 530 is omitted and the program falls immediately to block 532.

The operation is continued in FIG. 10*b* where the meter slogan printing operation is shown. The postage dispensing command is checked, block 550, and the slogan header is read, block 552 to assure that the box is still connected. It will be understood that other identifying data may be used if desired. The information may be encrypted as previously described or other forms of handshake may be devised if desired. If the box is no longer connected, the NO path from decision block 554, causes an error message, box 556, and an appropriate meter display, box 558, while the image memory deletes the slogan, and the meter returns to the postage display mode, box 560. The YES path from decision block 554 falls to print the indicia and slogan, block 562, and then to the postage display, block .560, and from there returns to await the next dispense postage command. It will be appreciated from the foregoing that the checking of the connection prior to each printing assures that unauthorized printing of the slogan will not take place.

What is claimed is:

1. A method for control of messages to be printed by a bit-mapped printer comprising the steps of providing a plain text message for printing by the printer, encoding the message at the printer using a predetermined algorithm to provide an internally generated code, communicating the message to a data center, calculating at the data center an authorization code corresponding to the encoded message, comparing at the printer the authorization code with the internally generated code for enabling the printing of the message by said bit-mapped printer.

2. The method of claim 1 wherein the message is an advertising slogan to be printed on a mailpiece.

3. The method of claim 1 wherein the step of enabling the printer comprises the step of enabling storing the message in memory for printing thereof.

4. A method for changing printed messages in a postage meter comprising the steps of providing within said meter a plurality of messages, each of said messages being enabled for printing by a corresponding enabling bit activated in said meter, providing a decoding means in said meter for decoding an authorization code and for activating ones of said enabling bits in accordance with the decoding of the authorization code, communicating information to a data center in respect of the postage meter and a desired message to be enabled, providing to the meter an authorization code from the data center, said authorization code being operable for being decoded at said meter for enabling activation of the selected one of the enabling bits for printing of the desired message whereby security is provided for the implementation of the changes.

5. The method of claim 4 wherein the messages are inscriptions associated with classes of mail.

6. In a postage meter of the type including a bit-map printer, apparatus for control of messages to be printed by the bit-mapped printer comprising means for generating an internal code from predetermined postage meter information and a desired message, means for comparing at said meter an authorization code received from a data center with said internal code, said authorization code being based on the predetermined meter information and the desired message furnished to the data center, and means for storing the desired message in said postage meter when there is a match of said authorization code with said internal code at the comparison means.

7. The apparatus of claim 6 wherein the message is an advertising slogan to be printed on a mailpiece.

8. The apparatus of claim 6 wherein the means for storing comprises non-volatile memory for printing thereof.

9. The apparatus of claim 6 further comprising a graphics library for providing images for printing in association with the message and means for storing an image selected from the graphics library for printing in association with the message.

10. The apparatus of claim 9 wherein the graphics library store and message control apparatus are housed separately from the postage meter and communicate with the postage meter via a communication channel.

11. The apparatus of claim 10 wherein messages and graphics library reside in a plug-in read-only memory.

12. In combination, a postage meter of the type including a bit-map printer and apparatus for control of slogans to be printed by the bit-mapped printer, the apparatus comprising means external to the postage meter having means for connection and communication therewith, said apparatus including means for providing to said meter a message having identifying information associated therewith, means in said meter for receiving and storing said message, and means for receiving and comparing in said meter the identifying information from said apparatus prior to enabling the completion of printing of the slogan along with the dispensing of postage by the meter, whereby the connection of the postage meter to the apparatus for printing of the slogan in combination with the dispensing of postage is assured.

* * * * *